US011784794B2

(12) United States Patent
McElheny et al.

(10) Patent No.: US 11,784,794 B2
(45) Date of Patent: Oct. 10, 2023

(54) ACTIVE INTERPOSER FOR LOCALIZED PROGRAMMABLE INTEGRATED CIRCUIT RECONFIGURATION

(71) Applicant: Intel Corporation, Santa Clara, CA (US)

(72) Inventors: Peter John McElheny, Morgan Hill, CA (US); Aravind Dasu, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 200 days.

(21) Appl. No.: 16/992,946

(22) Filed: Aug. 13, 2020

(65) Prior Publication Data
US 2020/0374102 A1    Nov. 26, 2020

Related U.S. Application Data

(62) Division of application No. 16/372,297, filed on Apr. 1, 2019, now Pat. No. 10,778,414, which is a division
(Continued)

(51) Int. Cl.
*H04L 9/06*    (2006.01)
*H01L 23/498*    (2006.01)
(Continued)

(52) U.S. Cl.
CPC .......... *H04L 9/065* (2013.01); *H01L 23/3675* (2013.01); *H01L 23/49827* (2013.01);
(Continued)

(58) Field of Classification Search
CPC ................ H04L 9/065; H01L 23/3675; H01L 23/49827; H01L 23/49833; H01L 25/0657;
(Continued)

(56) References Cited

U.S. PATENT DOCUMENTS 5,787,007 A    7/1998   Bauer
6,461,895 B1    10/2002   Liang
(Continued)

FOREIGN PATENT DOCUMENTS

WO    0184323 A1    11/2001
WO    2014078133 A1    5/2014

OTHER PUBLICATIONS

Office Action for EP Application No. 17201911.9 dated Mar. 2, 2021.
(Continued)

*Primary Examiner* — Ajay Ojha
(74) *Attorney, Agent, or Firm* — Fletcher Yoder, P.C.

(57) ABSTRACT

A system may include a host processor, an interposer having memory elements, a coprocessor mounted on the interposer for accelerating tasks received from the host processor, and an auxiliary chip. The coprocessor, interposer, and auxiliary chip may be part of an integrated circuit package. The memory elements on the interposer may convey configuration bit streams to one or more logic sectors in programmable circuitry of the coprocessor. The interposer may be connected to a package substrate of the integrated circuit package using through-silicon vias, such that an active surface of the interposer faces an active surface of the coprocessor. Each logic sector may include one or more data registers that are loaded with configuration data from the memory elements. In some instances, the auxiliary chip may include a secondary memory for storing additional configuration bit streams for configuring the logic sectors of the coprocessor.

16 Claims, 10 Drawing Sheets

Related U.S. Application Data of application No. 15/381,981, filed on Dec. 16, 2016, now Pat. No. 10,291,397.

(51) Int. Cl.
| | | |
|---|---|---|
| *H01L 23/367* | (2006.01) | |
| *H01L 25/065* | (2023.01) | |
| *H01L 25/18* | (2023.01) | |
| *H03K 19/177* | (2020.01) | |
| *H03K 19/1776* | (2020.01) | |
| *H01L 23/36* | (2006.01) | |
| *H01L 23/00* | (2006.01) | |

(52) U.S. Cl.
CPC .... *H01L 23/49833* (2013.01); *H01L 25/0657* (2013.01); *H01L 25/18* (2013.01); *H03K 19/177* (2013.01); *H03K 19/1776* (2013.01); *H01L 23/36* (2013.01); *H01L 24/17* (2013.01); *H01L 25/0652* (2013.01); *H01L 2224/16145* (2013.01); *H01L 2225/0652* (2013.01); *H01L 2225/06513* (2013.01); *H01L 2225/06527* (2013.01); *H01L 2225/06548* (2013.01); *H01L 2225/06589* (2013.01); *H01L 2924/1431* (2013.01); *H01L 2924/1437* (2013.01); *H01L 2924/1443* (2013.01)

(58) Field of Classification Search
CPC ......... H01L 25/18; H01L 23/36; H01L 24/17; H01L 25/0652; H01L 2224/16145; H01L 2225/06513; H01L 2225/0652; H01L 2225/06527; H01L 2225/06548; H01L 2225/06589; H01L 2924/1431; H01L 2924/1437; H01L 2924/1443; H01L 24/16; H01L 2224/13025; H01L 2224/131; H01L 2224/16227; H01L 2224/1703; H01L 2224/1712; H01L 2224/17181; H01L 23/34; H01L 25/065; H01L 25/0655; H03K 19/177; H03K 19/1776

See application file for complete search history.

(56) References Cited

U.S. PATENT DOCUMENTS

| | | | |
|---|---|---|---|
| 8,058,897 B1* | 11/2011 | Lu | H03K 19/177 326/38 |
| 8,922,243 B2 | 12/2014 | Jayasena et al. | |
| 9,106,229 B1 | 8/2015 | Hutton | |
| 9,344,091 B2 | 5/2016 | Jayasena et al. | |
| 2003/0233558 A1 | 12/2003 | Lieberman | |
| 2005/0285252 A1 | 10/2005 | Nair | |
| 2013/0071969 A1* | 3/2013 | Vodrahalli | H01L 24/17 438/107 |
| 2014/0032888 A1 | 1/2014 | O'Mullan et al. | |
| 2014/0181458 A1 | 6/2014 | Loh et al. | |
| 2015/0021787 A1* | 1/2015 | Jeong | H01L 25/0652 257/774 |
| 2015/0028918 A1 | 1/2015 | Hutton | |
| 2016/0126291 A1 | 5/2016 | Lu | |
| 2018/0102776 A1* | 4/2018 | Chandrasekar | G06F 1/3287 |

OTHER PUBLICATIONS

Office Action for CN Application No. 201711349647.5, dated Nov. 18, 2022.

* cited by examiner

ACTIVE INTERPOSER FOR LOCALIZED PROGRAMMABLE INTEGRATED CIRCUIT RECONFIGURATION

This application is a division of U.S. patent application Ser. No. 16/372,297, filed Apr. 1, 2019, which is a division of U.S. patent application Ser. No. 15/381,981, filed Dec. 16, 2016, which are hereby incorporated by reference herein in their entireties.

BACKGROUND

This relates to integrated circuits and, more particularly, to programmable integrated circuits.

Programmable integrated circuits are a type of integrated circuit that can be programmed by a user to implement a desired custom logic function. In a typical scenario, a logic designer uses computer-aided design tools to design a custom logic circuit. When the design process is complete, the computer-aided design tools generate configuration data. The configuration data is loaded into memory elements on a programmable integrated circuit to configure the device to perform the functions of the custom logic circuit.

Configuration data may be supplied to a programmable device in the form of a configuration bit stream. After a first configuration bit stream has been loaded onto a programmable device, the programmable device may be reconfigured by loading a different configuration bit stream in a process known as reconfiguration. An entire set of configuration data is often loaded during reconfiguration.

Programmable devices may be used for coprocessing in big-data or fast-data applications. For example, programmable devices may be used in application acceleration tasks in a datacenter and may be reprogrammed during datacenter operation to perform different tasks. However, the speed of reconfiguration of programmable devices is traditionally several orders of magnitude slower than the desired rate of virtualization in datacenters. Moreover, on-chip caching or buffering of pre-fetched configuration bit-streams to hide the latency of reconfiguration is undesirably expensive in terms of silicon real estate. Additionally, repeated fetching of configuration bit-streams from off-chip storage via the entire configuration circuit chain is energy intensive.

Situations frequently arise where it would be desirable to design and implement programmable devices with off-chip memory that enables improved reconfiguration speed and reduced energy consumption.

It is within this context that the embodiments herein arise.

SUMMARY

It is appreciated that the present invention can be implemented in numerous ways, such as a process, an apparatus, a system, a device, or a method on a computer readable medium. Several inventive embodiments of the present invention are described below.

A system may include a host processor and an integrated circuit package. The integrated circuit package may include a package substrate, an active interposer mounted on the package substrate, an integrated circuit (e.g., a coprocessor) mounted on the active interposer, and an auxiliary chip. The auxiliary chip may be mounted on the package substrate or, if desired, on the interposer. The interposer and the auxiliary chip may each contain memory elements for storing configuration data (e.g., configuration bit streams) for configuring programmable circuitry on the integrated circuit to perform a variety of tasks. The integrated circuit package may also include a heat sink that is attached to and in contact with the coprocessor integrated circuit. In some instances, the heat sink may also be placed in contact with the auxiliary chip.

The programmable circuitry of the integrated circuit may include multiple logic sectors that are coupled to respective associated logic sector managers. These logic sector managers may help retrieve the configuration bit streams from the memory elements of the interposer and the auxiliary chip. Each of the logic sectors may include an array of memory cells (e.g., configuration random access memory cells), an address register coupled to the array of memory cells, and a data register coupled to the array of memory cells.

The integrated circuit, the interposer, and the auxiliary chip may each include an active layer having an active side at which transistor circuitry (e.g., memory elements and programmable logic circuitry) is formed and an inactive layer (e.g., a bulk semiconductor layer) having an inactive back side. In some embodiments, the active sides of the integrated circuit and the interposer may be facing one another to facilitate faster reconfiguration of programmable circuitry on the integrated circuit. In these embodiments, the interposer may communicate with the package substrate using through silicon vias in the inactive layer of the interposer and may communicate with the integrated circuit through microbumps interposed between the active side of the integrated circuit and the active side of the interposer.

In other embodiments, the active side of the interposer may be facing the package substrate and the backside of the interposer may be facing the active side of the integrated circuit. In these embodiments, the interposer may communicate with the integrated circuit using through silicon vias in the inactive layer of the interposer.

In some embodiments, the auxiliary chip may be mounted on the package substrate adjacent to the interposer. In these embodiments, the active side of the auxiliary chip may be facing the package substrate and may be electronically coupled to the interposer through an embedded multi-die interconnect bridge in the package substrate. The backside of the auxiliary chip may be in contact with the heat sink.

In other embodiments, the auxiliary chip may be interposed between the package substrate and the integrated circuit. In these embodiments, the active side of the auxiliary chip may be facing the active side of the integrated circuit, and the auxiliary chip may communicate with the package substrate using through silicon vias in the inactive layer of the auxiliary chip.

In other embodiments, the auxiliary chip may be mounted on the interposer. In these embodiments, the active side of the auxiliary chip may be facing the interposer and the backside of the auxiliary chip may be in contact with the heat sink.

When new configuration bit streams are received by the integrated substrate package, the bit streams may be stored in the memory elements of the interposer or in the memory elements of the auxiliary chip. For instances in which the interposer includes decryption/decompression circuitry, the received configuration bit streams may be decrypted and decompressed using the decryption/decompression circuitry in the interposer. For instances in which the integrated circuit includes decompression/decryption circuitry, the received configuration bit streams may instead be decrypted and decompressed at the integrated circuit before being passed back to the memory elements of the interposer or the memory elements of the auxiliary chip for storage. Some or all of the stored configuration bit streams may then be sequentially loaded onto one or more logic sectors within the programmable circuitry of the integrated circuit.

When a configuration bit stream is requested for configuring the integrated circuit die, a request may be sent to the interposer and optionally to the auxiliary chip to determine whether a requested configuration bit stream is stored in the memory elements of the interposer or in the memory elements of the configuration bit stream. In response to determining that the requested configuration bit stream is missing from both the memory elements of the interposer and the memory elements of the interposer, the integrated circuit may request the confirmation bit stream from off-package (e.g., from the host processor or from an external memory). Otherwise, if the requested configuration bit stream is stored on the memory elements of the auxiliary chip or on the memory elements of the interposer, then the requested configuration bit stream may be sequentially loaded onto the programmable circuitry of the integrated circuit die.

Further features of the invention, its nature and various advantages will be more apparent from the accompanying drawings and following detailed description.

DETAILED DESCRIPTION

Embodiments of the present invention relate to integrated circuits and, more particularly, to programmable integrated circuits. It will be recognized by one skilled in the art, that the present exemplary embodiments may be practiced without some or all of these specific details. In other instances, well-known operations have not been described in detail in order not to unnecessarily obscure the present embodiments.

Programmable integrated circuits use programmable memory elements to store configuration data. Configuration data may be generated based on source code corresponding to application-specific tasks to be performed in parallel on the programmable integrated circuit. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

It may sometimes be desirable to configure or reconfigure the programmable integrated circuit as an accelerator circuit to efficiently perform parallel processing tasks. The accelerator circuit may include multiple columns soft processors of various types that are specialized for different types of parallel tasks. The accelerator circuit may be dynamically reconfigured to optimally assign and perform the parallel tasks.

Figure 1:
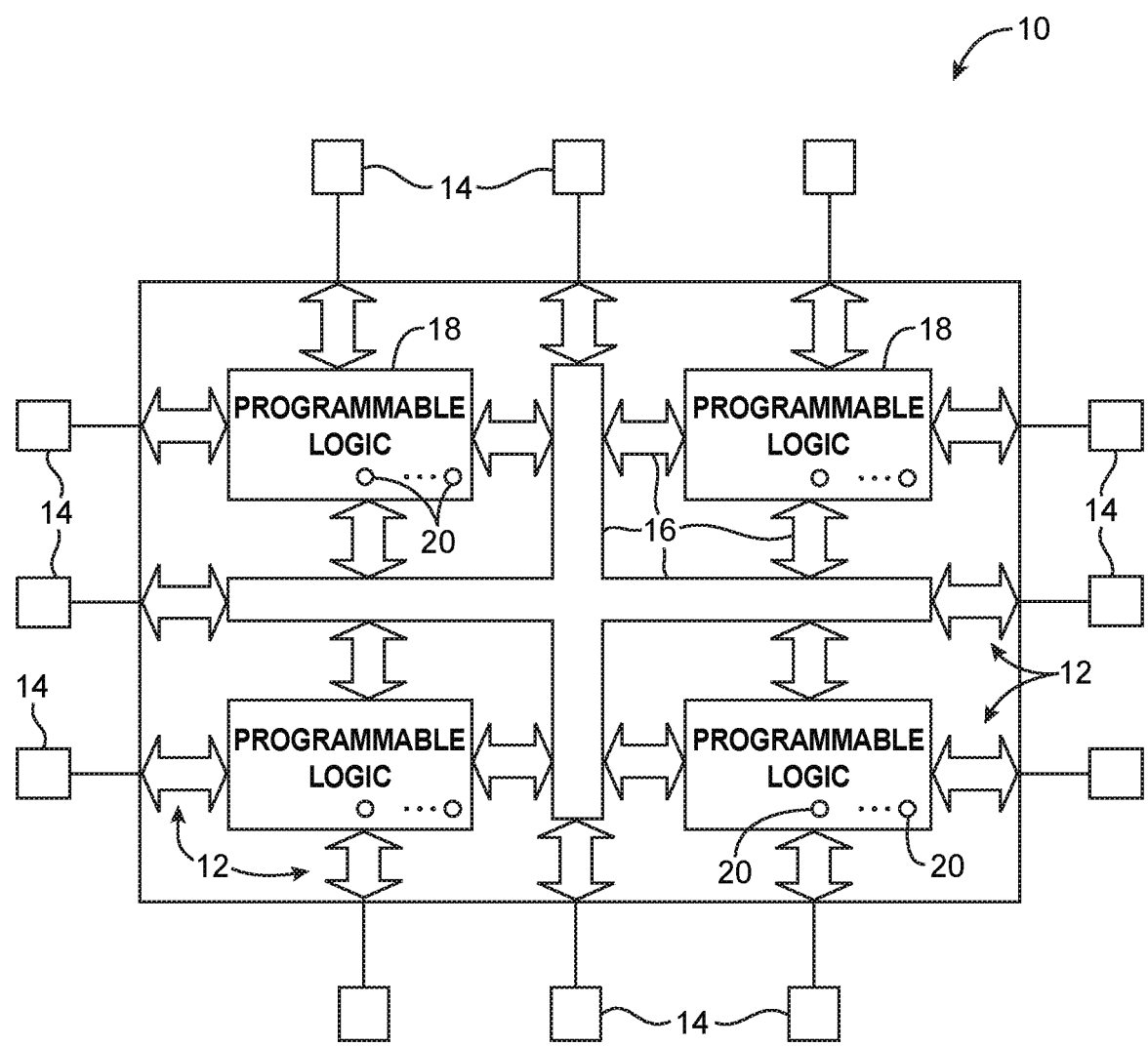
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
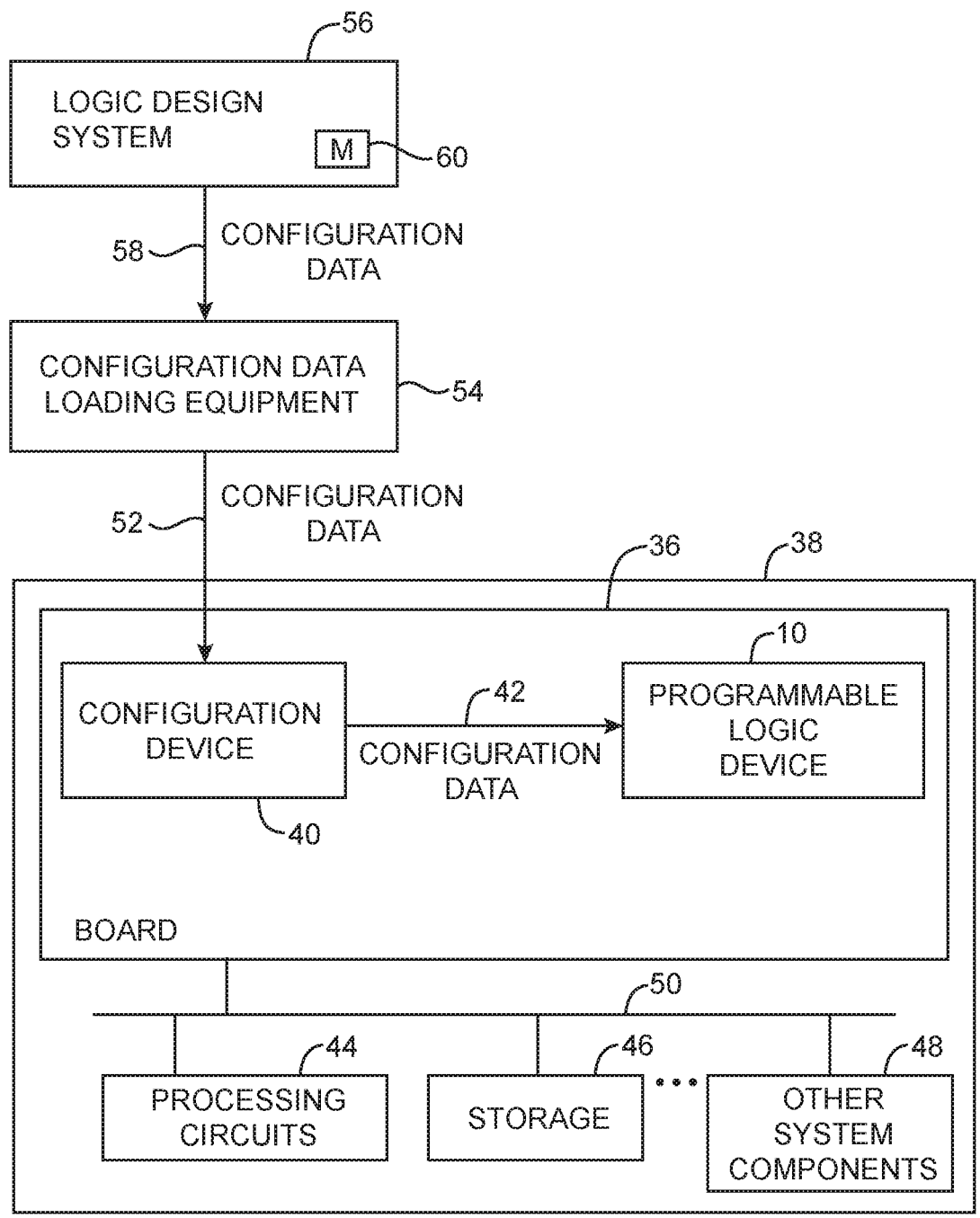
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or another suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data, which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

Figure 3:
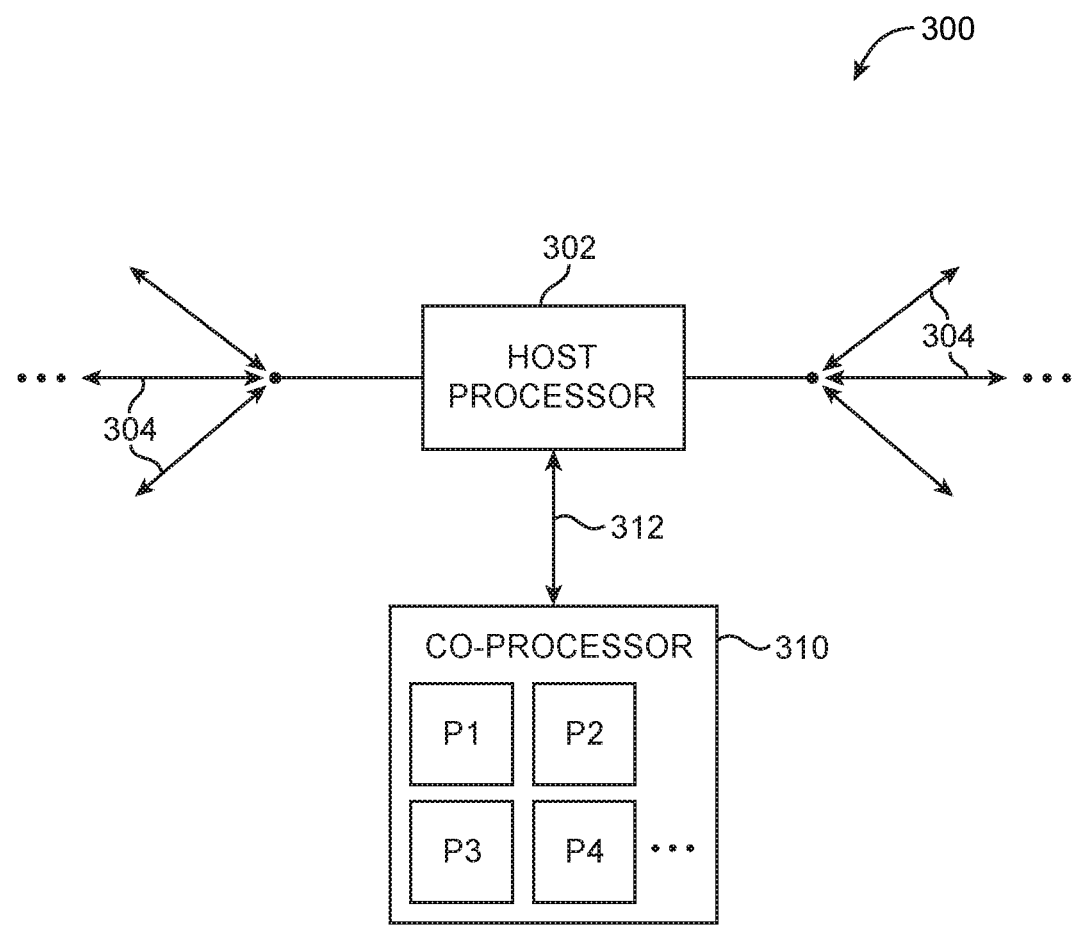
FIG. 3 is a diagram showing how a programmable integrated circuit may be used as a coprocessor in support of a host processor in accordance with an embodiment.

Partial reconfiguration may be a particularly useful feature when developing an acceleration framework. For example, consider a scenario in which a system such as system 300 includes a host processor 302 that is coupled to other network components via paths 304 (see, e.g., FIG. 3). As shown in FIG. 3, host processor 302 may be coupled to a coprocessor (e.g., an accelerator circuit) such as coprocessor 310 (sometimes referred to herein as accelerator circuit 310, or accelerator 310) via path 312. Accelerator circuit 310 may be a programmable integrated circuit such as device 10 of FIG. 1 or alternatively, multiple accelerator circuits may be in a programmable integrated circuit. Accelerator circuit 310 may include various processing nodes (e.g., processing cores, processor cores) such as cores P1-P4 to help accelerate the performance of host processor 302. Cores P1-P4 may be soft processor cores or soft processors that are configurable (e.g., programmable). In some instances, processor cores such as cores P1-P4 may be implemented as logic sectors in accelerator circuit 310.

Configured as such, accelerator circuit 310 may sometimes be referred to as a "hardware accelerator." As examples, the processing cores on the coprocessor may be used to accelerate a variety of functions, which may include but are not limited to: encryption, Fast Fourier transforms, video encoding/decoding, convolutional neural networks (CNN), firewalling, intrusion detection, database searching, domain name service (DNS), load balancing, caching network address translation (NAT), and other suitable network packet processing applications, just to name a few.

Figure 4:
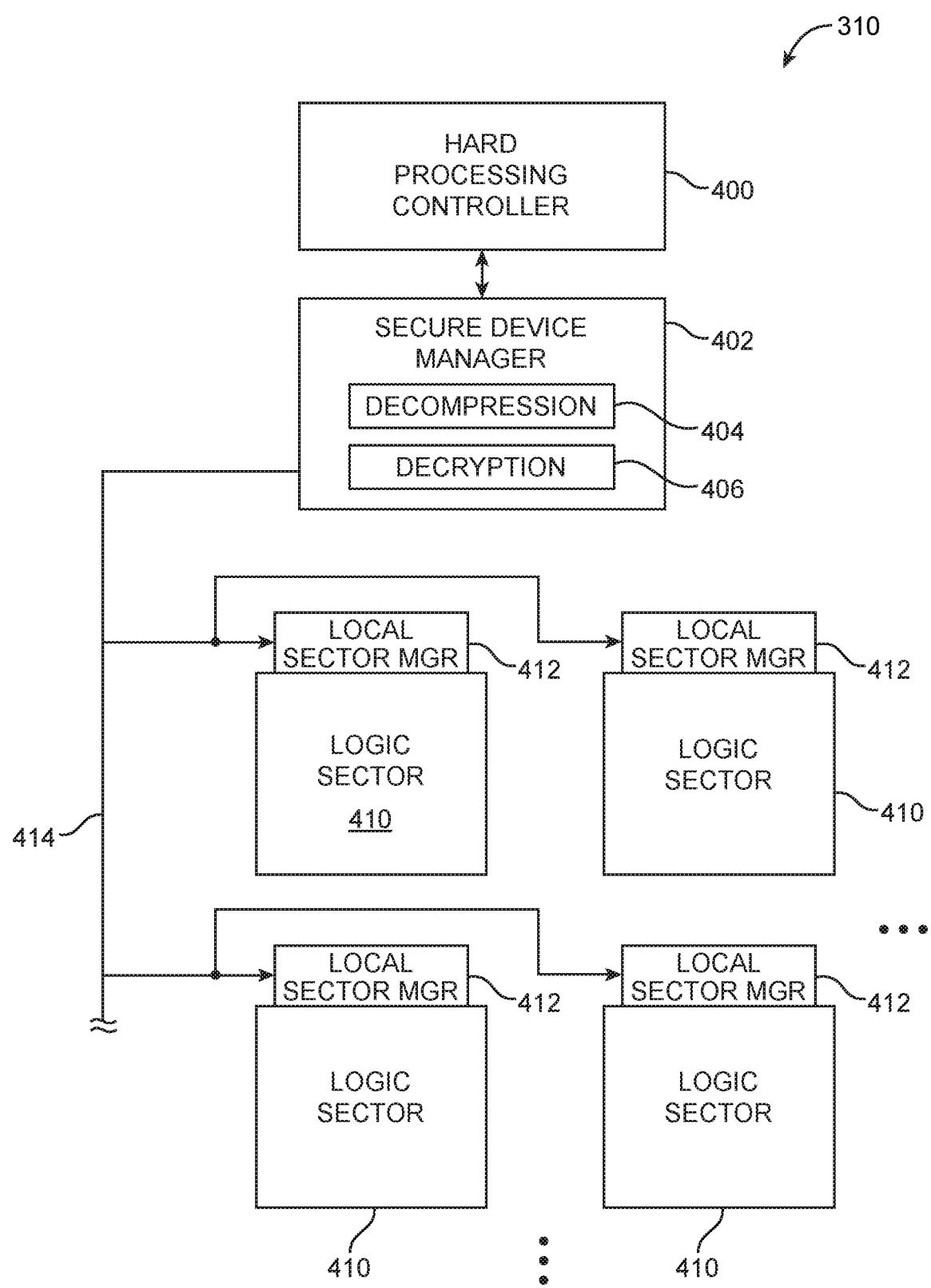
FIG. 4 is a diagram of an illustrative programmable integrated circuit having multiple logic sectors managed by local sector managers and a secure device manager in accordance with an embodiment.

For instances in which cores P1-P4 are implemented as logic sectors in accelerator circuit 310, each logic sector may be managed using local sector managers, which may in turn be managed using a secure device manager. As shown in FIG. 4, accelerator circuit 310 may include multiple logic sectors 410 (sometimes referred to as sectors 410). Each logic sector may be managed by a respective one of local sector managers (LSM) 412. Logic sector managers 412 may be managed by secure device manager 402. Hard processing controller 400 may receive configuration data (e.g., configuration bit streams) and/or accelerator requests from a host processor (e.g., host processor 302 of FIG. 3). Secure device manager 402 may receive the configuration data, the accelerator requests, and commands from hard processing controller 400. Hard processing controller 400 may, for instance, be a microprocessor. Secure device manager 402 may provide commands, configuration data, and acceleration requests to local sector managers 412 over a bus 414.

In some instances, the configuration data and accelerator requests may optionally be compressed and encrypted. Thus, secure device manager 402 may include decompression engine 404 and decryption engine 406 for decompressing and decrypting data received from the host processor through hard processing controller 400.

Logic sectors 410 may be individually configurable/programmable. This allows each of logic sectors 410 to independently process different tasks in parallel. The parallel processing enabled by logic sectors 410 may be utilized to perform application acceleration (e.g., in a datacenter) for a variety of tasks or jobs simultaneously by reconfiguring different subsets of the logic sectors to perform said tasks.

In order to efficiently manage application acceleration as new tasks are issued to accelerator circuit 310 from the host processor, it may be necessary to perform real-time reconfiguration on any of logic sectors 410 that will be used to process a given newly received task. In other words, reconfiguration of logic sectors 410 may be performed while accelerator circuit 310 is running and may be performed without interrupting the operation of accelerator circuit 310.

The selection of which of logic sectors 410 are to be used for a given task may be determined by identifying which sectors are idle (e.g., not presently performing a task) and by identifying which sectors are handling lower-priority tasks (e.g., tasks without a fixed time budget) compared to the priority of the given task. Some or all of logic sectors 410 that are identified as being idle or as performing less critical tasks may then be selected, and if necessary, reconfigured to perform operations of the given task. Reassignment of logic sectors 410 that are working on a lower-priority task than the given task in need of sector assignment may be performed based on a load-balancing mechanism. It should be noted that those logic sectors 410 that are identified as already being configured to perform the given task may be given selection priority over any sectors that would need to be reconfigured to perform said task.

Figure 5:
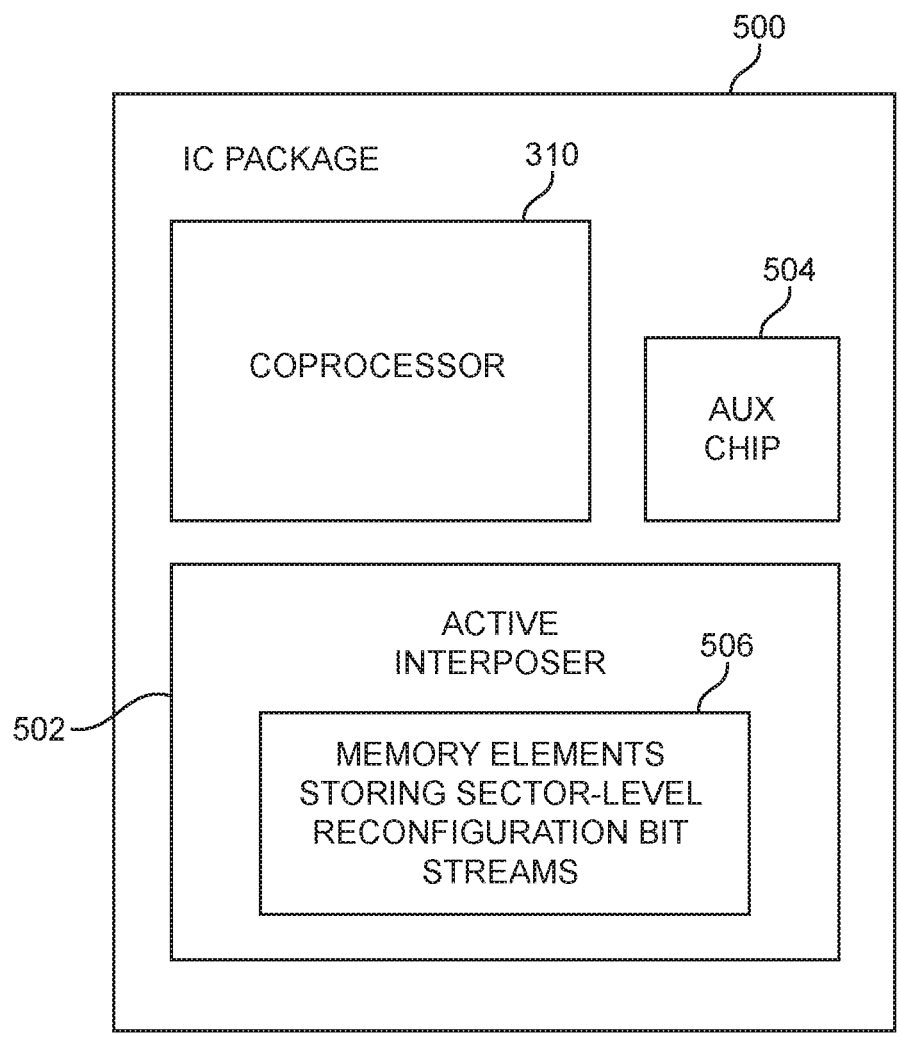
FIG. 5 is an illustrative integrated circuit package that includes a coprocessor programmable integrated circuit, an active interposer that includes memory elements for storing configuration data, and an auxiliary chip in accordance with an embodiment.

Configuration data received by accelerator circuit 310 may be stored in memory on the same circuit package as accelerator circuit 310. As shown in FIG. 5, coprocessor 310, and an active interposer 502 (sometimes referred to as interposer 502), and an auxiliary chip 504 may be mounted on or integrated as part of an integrated circuit (IC) package 500. Interposer 502 may include memory elements 506, which may be used to store configuration bit streams for reconfiguring programmable logic sectors on coprocessor 310. Memory elements 506, for example, may be a smart CRAM cache containing SRAM memory cells or non-volatile memory cells.

In some instances interposer 502 may also include decryption/decompression circuitry (not shown) for decrypting and decompressing configuration bit streams (e.g., received from the host processor or external memory). If desired, coprocessor 310 may instead include this decryption/decompression circuitry.

Auxiliary chip 504 may be one of a variety of chips, including a transceiver chip, a volatile memory (e.g., high bandwidth memory) chip, or a non-volatile memory (e.g., 3D XPoint) chip. In instances in which auxiliary chip 504 is a memory chip, chip 504 may be used as a secondary cache for storing configuration bit streams used in reconfiguring logic sectors of coprocessor 310.

Configuration data from host processor 302 may be loaded onto memory elements 506 of interposer 502 (and optionally onto memory elements in auxiliary chip 504) after undergoing processing/routing through secure device manager 402 of coprocessor 310 (e.g., after undergoing decompression and decryption). The configuration data may include one or more sector-level reconfiguration bit streams. When one of sectors 410 is selected to perform a task, if that sector needs to be reconfigured to perform the task (e.g., because the sector is presently configured to perform a different task), then secure device manager 402 may provide the selected sector with a pointer to the location of the necessary configuration bit stream (e.g., persona) required to perform that task in memory elements 506.

In some scenarios, the memory elements 506 may not already have the necessary configuration bit stream stored when said bit stream is needed by the selected sector. In this case, secure device manager 402 may retrieve the necessary configuration bit stream from external memory or from auxiliary chip 504 and may load the retrieved bit stream onto the selected sector and onto memory elements 506.

Figure 6:
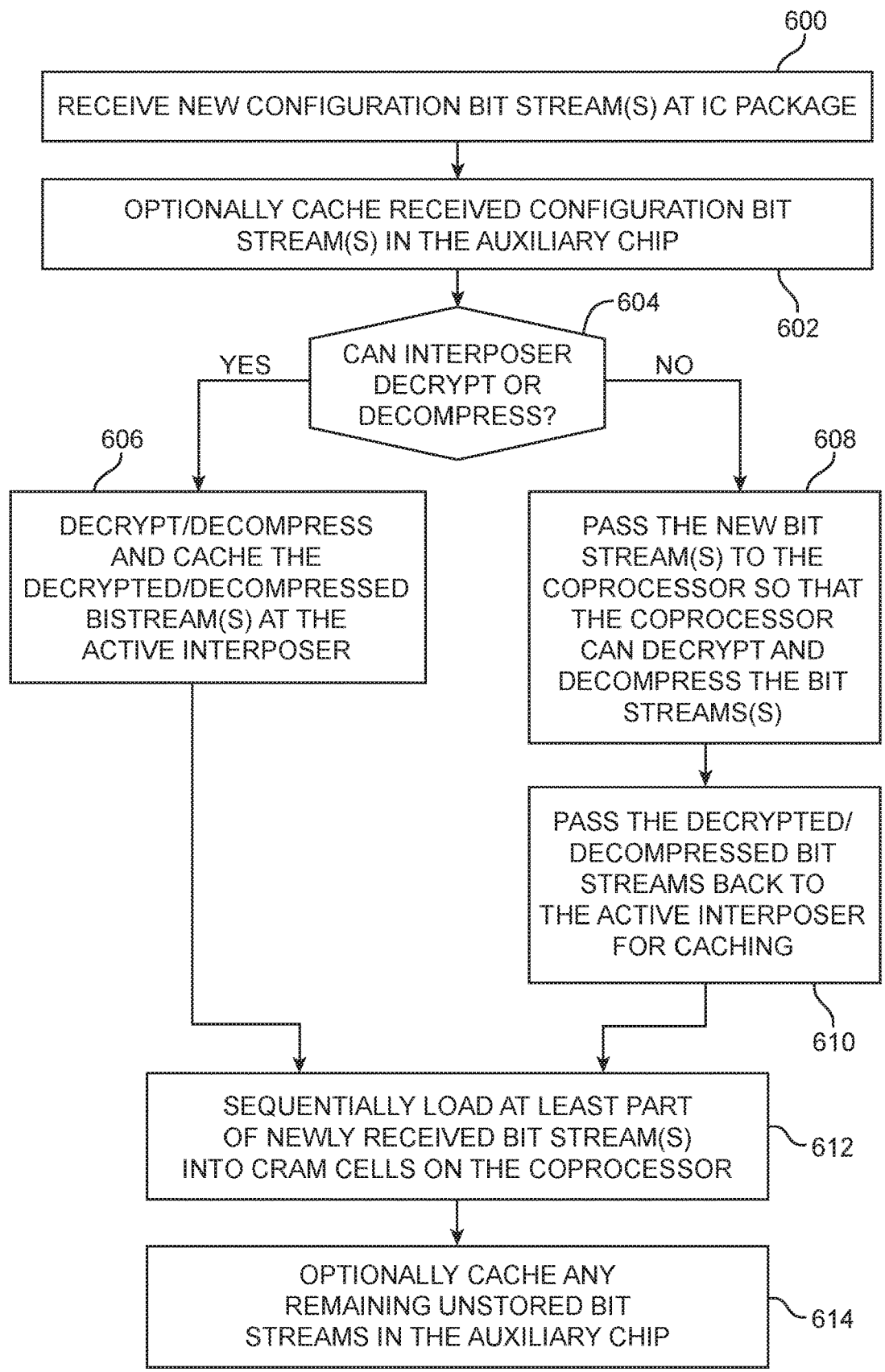
FIG. 6 is a flow chart of illustrative steps for loading configuration bit streams into logic sectors of a coprocessor programmable integrated circuit and caching the configuration bit streams at an active interposer in accordance with an embodiment.

Coprocessor 310, interposer 502, and auxiliary chip 504 described above in connection with FIGS. 3-5 may perform steps for receiving and storing configuration bit streams from a host processor when new configuration bit streams are received at package 500 (e.g., during a pre-fetch phase of an instruction cycle, or in response to a memory request being sent by coprocessor 310) (see, e.g., illustrative steps of FIG. 6).

At step 600, one or more new configuration bit streams may be provided to an integrated circuit package from a host processor (e.g., integrated circuit package 500 of FIG. 5 and host processor 302 of FIG. 3, respectively) for a set of anticipated configuration bit streams. The anticipated configuration bit streams may correspond to processing tasks in need of acceleration. For example, these new configuration bit streams may be sent during a pre-fetch phase of an instruction cycle. Alternatively, the new configuration bit streams may be sent in response to a memory request sent out by a coprocessor (e.g., coprocessor 310 of FIG. 3) when coprocessor 310 determines that one or more configuration bit streams needed to perform a given task is not present in memory elements of an interposer (e.g., memory elements 506 in interposer 502).

At step 602, the new configuration bit streams may optionally be cached in an auxiliary chip (e.g., auxiliary chip 504 of FIG. 5). For example, the new configuration bit streams may be stored in auxiliary chip 504 if it is detected that the memory elements 506 of interposer 502 do not have sufficient space to store the bit streams. In some instances, the configuration bit streams currently stored in memory elements 506 of interposer 502 may be moved to auxiliary chip 504 to make room for the new configuration bit streams on memory elements 506.

At step 604, if interposer 502 includes decryption/decompression capabilities (e.g., decryption/decompression circuits), the method may proceed to step 606. Otherwise, if interposer 502 does not include decryption/decompression capabilities, the method may proceed to step 608.

At step 606, the new configuration bit streams may be decrypted and decompressed using the decryption/decompression circuits of interposer 502 and the decrypted/decompressed bit streams may be cached at interposer 502.

At step 608, the new configuration bit streams may be passed to coprocessor 310 and decryption/decompression circuitry on coprocessor 310 may decrypt/decompress the bit streams.

At step 610, the decrypted/decompressed bit streams may be passed back to interposer 502 where the bit streams may be subsequently cached in memory elements 506 on interposer 502.

After the completion of either step 606 or step 610, step 612 may be performed. At step 612, at least part of the decrypted/decompressed bit streams may be sequentially loaded into configuration random access memory (CRAM) cells on the coprocessor (e.g., into CRAM cells in one or more of sectors 410 of coprocessor 310 of FIG. 4).

At step 614, any remaining unstored decrypted/decompressed bit streams may optionally be cached in auxiliary chip 504. For example, if memory elements 506 in interposer 502 do not have sufficient space to store a portion of the configuration bit streams used to configure the CRAM cells of sectors 410, that portion of the configuration bit streams may be stored in auxiliary chip 504.

Figure 7:
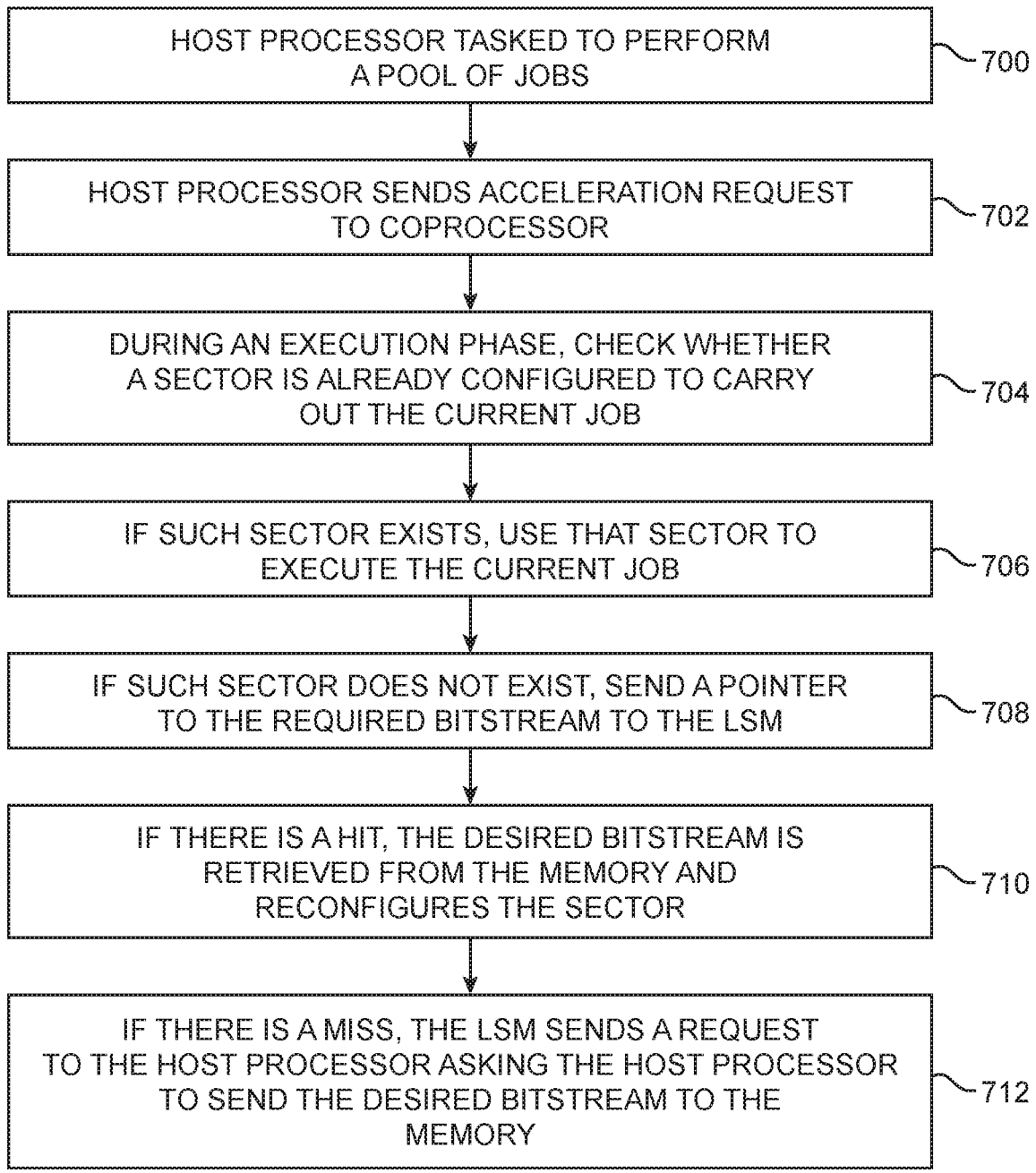
FIG. 7 is a flow chart of illustrative steps for performing logic sector management for the programmable integrated circuit of FIG. 4 to handle acceleration requests received from a host processor in accordance within an embodiment.

Coprocessor 310 and interposer 502 described above in connection with FIGS. 3-6 may perform steps for managing sectors to perform a pool of jobs/tasks received from host processor 302 (see, e.g., illustrative steps of FIG. 7).

At step 700, a host processor (e.g., host processor 302 of FIG. 3) may be tasked to perform a pool of jobs/tasks. In order to improve the speed at which these tasks are performed (e.g., to accelerate the tasks), a coprocessor (e.g., accelerator circuit 310 of FIGS. 3-6) may be used to perform at least a subset of the pool of tasks.

At step 702, host processor 302 may send an acceleration request to coprocessor 310. This acceleration request may be received by a secure device manager (e.g., secure device manager 402 of FIG. 4), which may identify one or more logic sectors (e.g., of logic sectors 410 of FIG. 4) that are available to perform one or more given tasks associated with the acceleration request.

At step 704, during an execution phase of the instruction cycle, secure device manager 402 may communicate with local sector managers (e.g., local sector managers 412 of FIG. 4) at each of logic sectors 410 to determine whether any of logic sectors 410 are already configured to carry out the given task. Depending on whether a sector exists that is pre-configured to carry out the given task, the process may proceed to either step 706 or step 708.

At step 706, if such a pre-configured sector exists, that sector may be selected and used to execute the given task.

At step 708, if such a pre-configured sector does not exist, host processor 302 may provide local sector manager 412 of an available sector with a pointer to the location of the configuration bit stream required for performing the given task that is stored in memory elements in an active interposer (e.g., memory elements 506 in active interposer 502 of FIG. 5) or in memory elements of an auxiliary chip (e.g., auxiliary chip 504 of FIG. 5). Configuration data stored on memory elements 506 of interposer 502 or on the memory elements of auxiliary chip 504, for example, may be unencrypted. However, it is possible that the required configuration bit stream will not be present in memory elements 506 of interposer 502 or on the memory elements of auxiliary chip 504. Thus, local sector manager 412 may check to determine whether the required configuration data is present in memory elements 506 of interposer 502 or on the memory elements of auxiliary chip 504. If the required configuration data is present in memory elements 506 of interposer 502 or on the memory elements of auxiliary chip 504, then the process may proceed to step 710. Otherwise, the process may proceed to step 712.

At step 710, if the required configuration data is stored in memory elements 506 of interposer 502 or on the memory elements of auxiliary chip 504 (e.g., if there is a cache hit), the required or desired configuration bit stream may be retrieved from those memory elements and may be used to reconfigure the available sector (e.g., by loading the required configuration bit stream onto the available sector). The configuration image stored in memory elements 506 of interposer 502 or on the memory elements of auxiliary chip 504 may not be encrypted. Memory elements 506 of interposer 502 and the memory elements of auxiliary chip 504 may act as instruction caches from which configuration data (e.g., bit streams) are fetched by the local sector managers for reconfiguring logic sectors 410. If the required configuration bit stream is fetched from the memory elements of auxiliary chip 504, then the required configuration bit stream may be passed to the memory elements 506 of interposer 502 before being loaded onto the available logic sector with the required configuration bit stream. Alternatively, the required configuration bit stream may be directly loaded from the memory elements of auxiliary chip 504 onto the available logic sector.

At step 712, if the required configuration data is not stored in memory elements 506 of interposer 502 or on the memory elements of auxiliary chip 504 (e.g., if there is a cache miss), local sector manager 412 of the available sector may send a request to host processor 302 asking that host processor 302 provide the required configuration bit stream to memory elements 506 of interposer 502 or on the memory elements of auxiliary chip 504. For example, the required configuration bit stream may be retrieved from off-package directly from host processor 302 or from an external memory. Local sector manager 412 may then load the required configuration bit stream onto the available sector as described in connection with step 710, thereby reconfiguring the available sector. In some scenarios, local sector manager 412 may receive the required configuration bit stream from host processor 302 directly through secure device manager 402, in which case the required configuration bit stream may also be stored on memory elements 506 of interposer 502 or on the memory elements of auxiliary chip 504.

Figure 8:
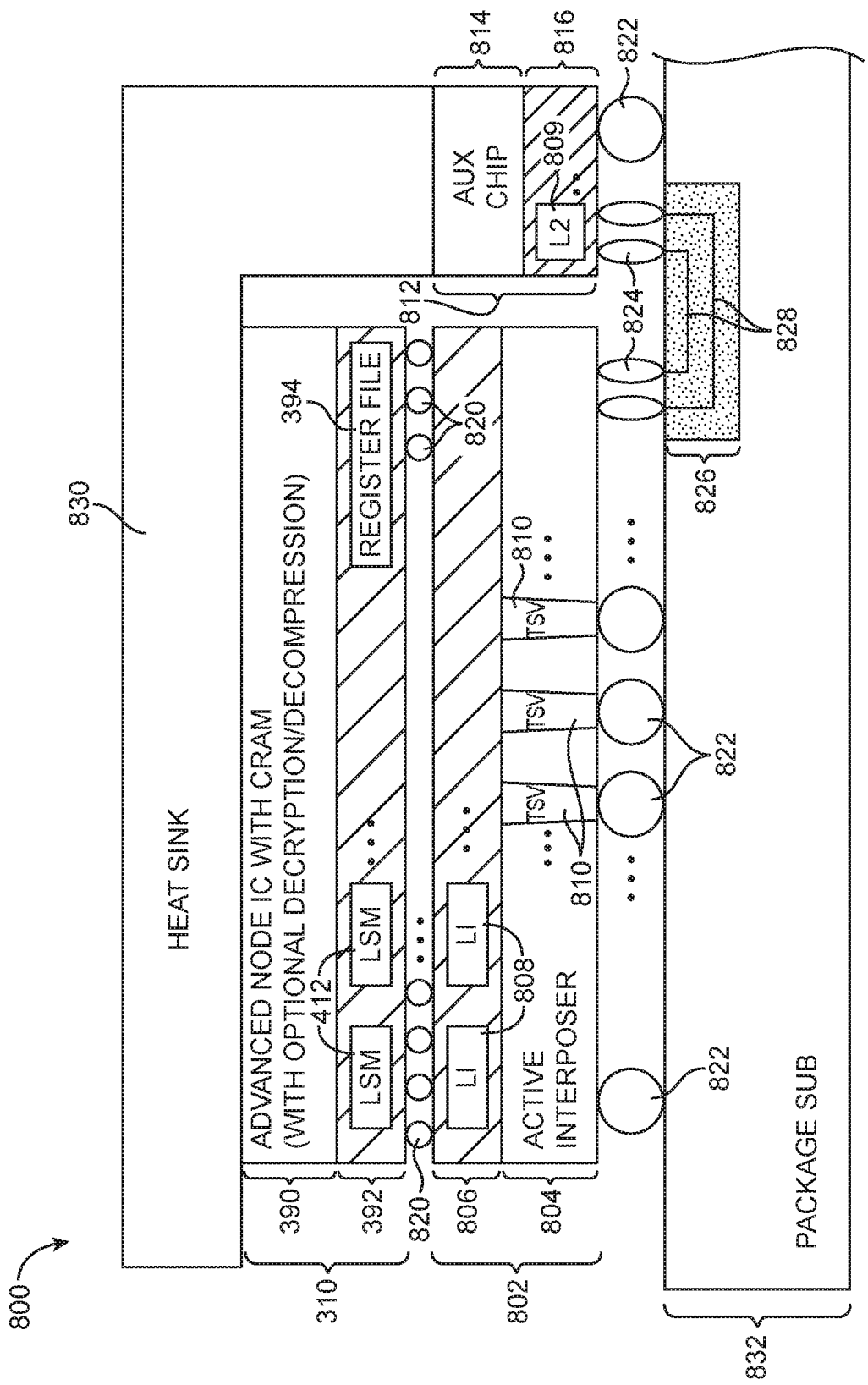
FIG. 8 is a cross-sectional side view of the integrated circuit package of FIG. 5 in which the active interposer and the coprocessor programmable integrated circuit have active sides facing each other and in which the auxiliary chip is connected to the active interposer through an embedded multi-die interconnect bridge in accordance within an embodiment.

A cross-sectional side view of an IC package having a stacked coprocessor and smart active interposer is shown in FIG. 8. As shown in FIG. 8, IC package 800 may include active interposer 802 stacked on package substrate 832, coprocessor 310 (sometimes referred to as an advanced node IC with CRAM) stacked on interposer 802, auxiliary chip 812 stacked on package substrate 832, and heat sink 830 placed on and in contact with coprocessor 310 and auxiliary chip 812.

Coprocessor 310 and its functions are described in detail in connection with FIGS. 3-7 above. These descriptions are not repeated here for the sake of brevity. Coprocessor 310 may include an active layer 392 and a bulk semiconductor layer 390 (sometimes referred to herein as inactive layer 390). The front surface of active layer 392 may sometimes be referred to herein as an active side. The opposing surface of bulk semiconductor layer 390 may sometimes be referred to as a backside. Active layer 392 may include the circuit elements of coprocessor 310 described in connection with FIG. 4 (e.g., hard processing controller 400, secure device manager 402, local sector managers 412, and logic sectors 410) formed at the active side. Active layer 392 may also include a register file 394, which may act as a central on-die memory for coprocessor 310. In some instances, coprocessor 310 may optionally include decryption/decompression circuitry for processing encrypted and/or compressed configuration bit streams.

Active interposer 802 may include an active layer 806 and a bulk semiconductor layer 804 (sometimes referred to as inactive layer 804). The front surface of active layer 806 may sometimes be referred to herein as an active side. The opposing surface of bulk semiconductor layer 804 may sometimes be referred to as a backside. Active layer 806 may include multiple level one (L1) memory elements 808 formed at the active side, which may be used as memory caches for storing configuration bit streams for configuring logic sectors 410 in coprocessor 310. L1 memory elements 808 may correspond to memory elements 506 in form and function described in connection with FIG. 5 above.

In some instances, active layer 806 may optionally include decryption/decompression circuitry for processing encrypted and/or decompressed configuration bit streams. Active interposer 802 may be electrically connected to package substrate 832 through solder 822 (sometimes referred to herein as solder bumps 822 or solder balls 822). Inactive layer 804 may include through silicon vias (TSVs) 810, which may connect components such as L1 memory elements 808 in active layer 806 to solder balls 822. For example, L1 caches 808 may receive configuration bit streams from a host processor through solder balls 822 and TSVs 810. By using TSVs 810 in this way, the energy efficiency of transferring signals and power between active layer 806 and package substrate 832 may be improved compared to traditional interposer interconnect arrangements.

By connecting active layer 806 of interposer 802 to package substrate 832 using TSVs 810 in inactive layer 804, active layer 806 of interposer 802 may be arranged facing active layer 392 of coprocessor 310, and may be electrically connected to components in active layer 392 through microbumps 820, which may be smaller and may have smaller pitch widths than solder balls 822. This arrangement may significantly shorten the distance traveled (and thereby reduce the latency of) signals transmitted between interposer 802 and coprocessor 310. This reduction in latency may advantageously increase the speed of reconfiguration of logic sectors 410 in coprocessor 310.

Auxiliary chip 812 may be placed adjacent to interposer 802 and may be stacked on package substrate 832. Auxiliary chip 812 may include an active layer 816 and a bulk semiconductor layer 814 (sometimes referred to as inactive layer 814). The front surface of active layer 816 may sometimes be referred to herein as an active side. The opposing surface of bulk semiconductor layer 814 may sometimes be referred to as a backside. Active layer 816 may include level two (L2) memory elements 809 formed at the active side, which may be used as memory caches for storing configuration bit streams for configuring logic sectors 410 in coprocessor 310.

For example, configuration bit streams stored in L1 memory elements 808 on interposer 802 may be transferred to L2 memory elements 809 to make room on L1 memory elements 808 for new incoming configuration bit streams (e.g., received at L1 memory elements 808 from a host processor). Active layer 816 of auxiliary chip 812 may be arranged facing package substrate 832 and may be electrically connected to package substrate 832 through solder balls 822 and solder balls 824. Solder balls 824 may be smaller than and may have smaller pitch widths than solder balls 822.

An embedded multi-die interconnect bridge (EMIB) 826 may be used to connect auxiliary chip 812 to interposer 802. EMIB 826 may include interconnects 828 formed in a silicon substrate that is embedded in package substrate 832. Interconnects 828 may electrically connect the portion of solder balls 824 connected to auxiliary chip 812 to the portion of solder balls 824 connected to interposer 802.

Heat sink 830 may be placed in contact with inactive layer 390 of coprocessor 310 and inactive layer 814 of auxiliary chip 812 in order to remove heat from coprocessor 310 and auxiliary chip 812. Active interposer 802 may perform minimal processing and therefore may generate minimal heat. Thus, it may not be necessary to put heat sink 830 in contact with interposer 802.

Figure 9:
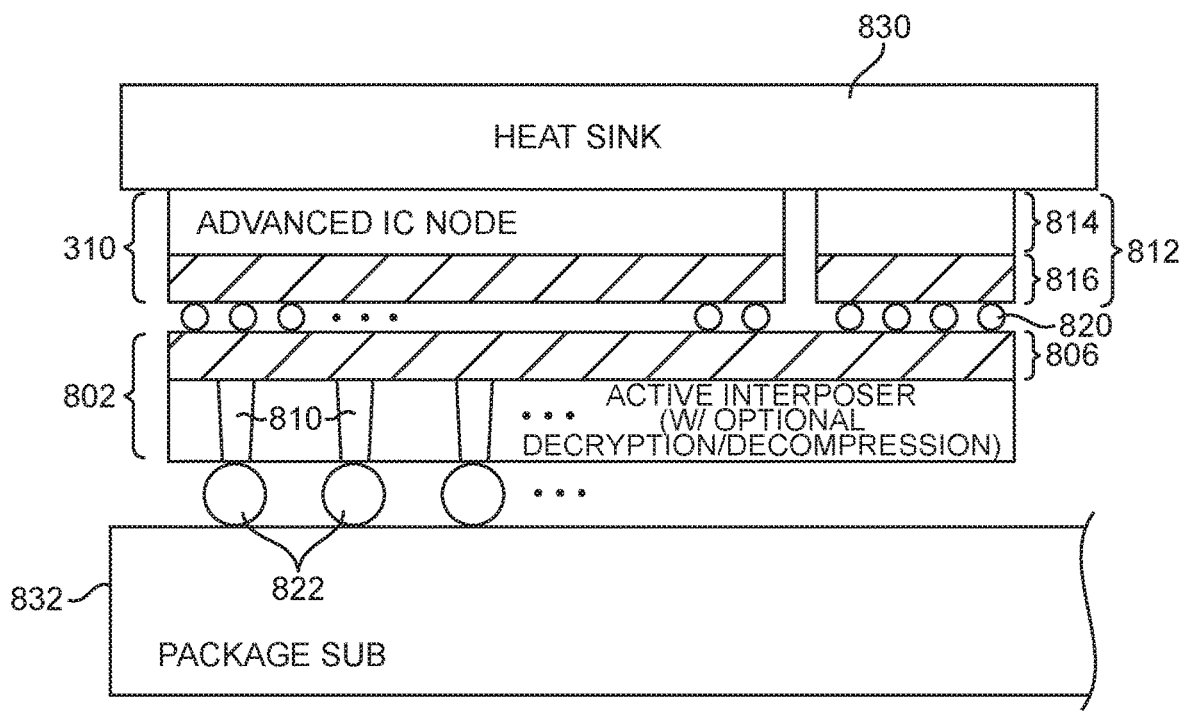
FIG. 9 is a cross-sectional side view of the integrated circuit package of FIG. 5 in which the auxiliary chip is disposed on the active interposer in accordance with an embodiment.
Figure 10:
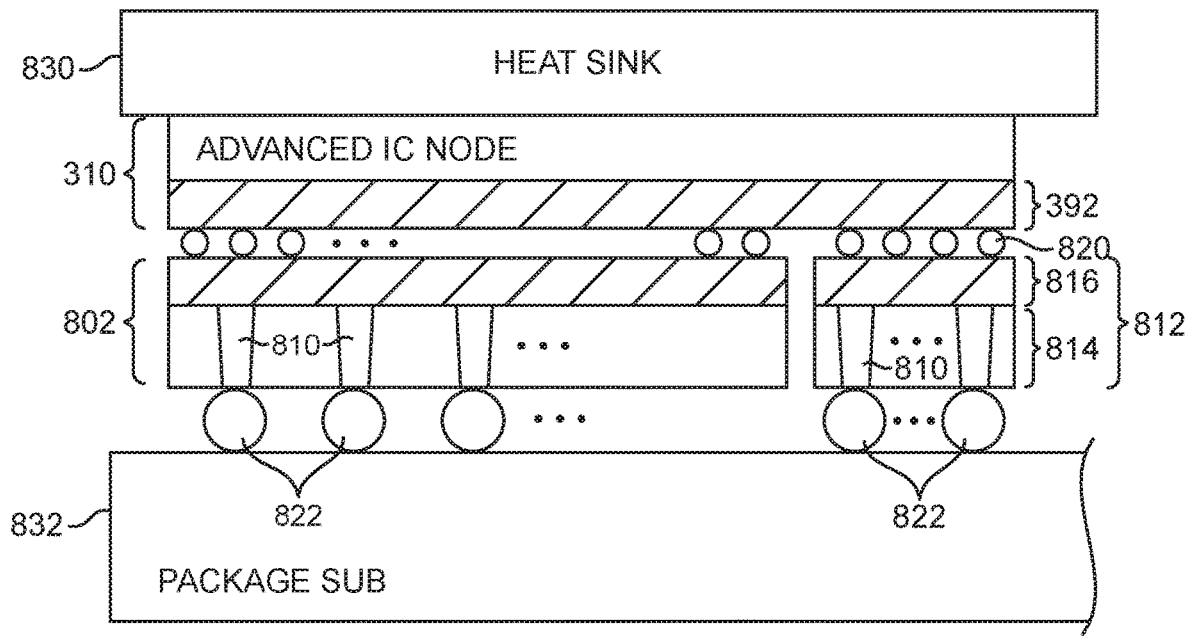
FIG. 10 is a cross-sectional side view of the integrated circuit package of FIG. 5 in which the auxiliary chip is disposed between the coprocessor programmable integrated circuit and the package substrate in accordance with an embodiment.
Figure 11:
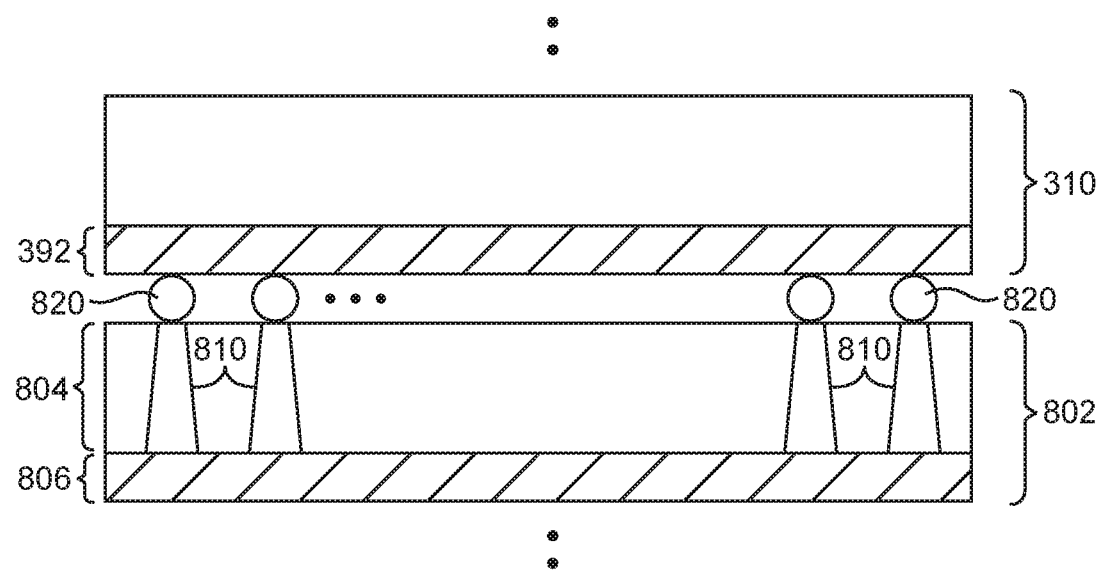
FIG. 11 is a cross-sectional side view of the integrated circuit package of FIG. 5 in which the coprocessor integrated circuit has an active side that faces an inactive back side of the active interposer in accordance with an embodiment.

Alternative arrangements for package 800 are shown in FIGS. 9-11.

As shown in FIG. 9, instead of being stacked on package substrate 832 directly, auxiliary integrated circuit die 812 may be stacked on active interposer 802. In this arrangement, auxiliary circuit 812 may communicate with active interposer 802 directly without having to pass signals through package substrate 832. Active layer 816 of auxiliary circuit 812 and active layer 806 of active interposer 802 may be arranged facing one another in order to reduce communications latency between interposer 802 and auxiliary circuit 812. Similar to the arrangement of FIG. 8, heat sink 830 may be in contact with both coprocessor 310 and auxiliary circuit 812 to dissipate heat from both coprocessor 310 and auxiliary chip 812.

As shown in FIG. 10, auxiliary circuit 812 may be interposed between coprocessor 310 and package substrate 832. Active layer 392 of coprocessor 310 and active layer 816 auxiliary circuit 812 may be arranged facing one another in order to reduce communications latency between auxiliary circuit 812 and coprocessor 310. The inactive layer 814 of auxiliary circuit 812 may include TSVs 810, which may transfer signals from package substrate 832 and solder balls 822 to active layer 816 of auxiliary circuit 812. In this arrangement, configuration bit streams may be transferred between auxiliary circuit 812 and active interposer 802 through either coprocessor 310 or package substrate 832.

As shown in FIG. 11, active interposer 802 may be arranged such that inactive layer 804 of interposer 802 is facing active layer 392 of coprocessor 310. In this arrangement, TSVs 810 may be formed in inactive layer 804 of interposer 802 to connect active layer 392 of coprocessor 310 to active layer 806 of interposer 802 (e.g., through microbumps 820). Active layer 806 may interface with package substrate 832 through solder balls 822. This arrangement may advantageously improve communication speed between package substrate 832 and interposer 802, however communications between interposer 802 and coprocessor 810 may be somewhat slower compared to embodiments in which active layer 806 of interposer 802 is arranged facing active layer 392 of coprocessor 310.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IC circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The foregoing is merely illustrative of the principles of this invention and various modifications can be made by those skilled in the art. The foregoing embodiments may be implemented individually or in any combination.

What is claimed is:

1. An integrated circuit package, comprising:
a package substrate;
an integrated circuit mounted on the package substrate;
an interposer mounted on the package substrate, wherein the interposer comprises memory operable as a level of cache for the integrated circuit and configured to cache a configuration bit stream for the integrated circuit, and wherein the configuration bit stream configures programmable circuitry of the integrated circuit; and
an auxiliary chip comprising additional memory configurable to store an additional configuration bit stream for configuring the programmable circuitry, wherein the additional memory is operable as an additional level of cache for the integrated circuit.

2. The integrated circuit package of claim 1, wherein the integrated circuit comprises a decryption circuit configured to decrypt the configuration bit stream.

3. The integrated circuit package of claim 1, wherein the integrated circuit comprises a decompression circuit configured to decompress the configuration bit stream.

4. The integrated circuit package of claim 1, wherein the interposer further comprises a decryption circuit configured to decrypt the configuration bit stream.

5. The integrated circuit package of claim 1, wherein the interposer further comprises a decompression circuit configured to decompress the configuration bit stream.

6. The integrated circuit package of claim 1, wherein the auxiliary chip is mounted directly on the package substrate.

7. The integrated circuit package of claim 1, wherein the auxiliary chip is mounted directly on the interposer.

8. An integrated circuit package, comprising:
a package substrate;
an integrated circuit mounted on the package substrate;
an interposer mounted on the package substrate; and
an auxiliary chip mounted on the package substrate and adjacent the interposer, wherein the auxiliary chip comprises memory configurable to cache a configuration bit stream from the integrated circuit.

9. The integrated circuit package of claim 8, wherein the interposer comprises second memory, and wherein the interposer is operable as a first level cache for the integrated circuit and the auxiliary chip is operable as a second level of cache for the integrated circuit.

10. The integrated circuit package of claim 9, wherein the configuration bit stream is loaded into the memory of the interposer in response to a request for configuring programmable circuitry of the integrated circuit.

11. The integrated circuit package of claim 8, wherein the integrated circuit is configured to request the configuration bit stream from an external memory.

12. The integrated circuit package of claim 8, wherein the integrated circuit comprises a local sector manager configurable to retrieve the configuration bit stream from the auxiliary chip.

13. The integrated circuit package of claim 8, wherein the interposer comprises decompression circuitry configurable to decompress the configuration bit stream.

14. The integrated circuit package of claim 8, wherein the integrated circuit comprises a decryption circuit configured to decrypt the configuration bit stream.

15. The integrated circuit package of claim 8, wherein the integrated circuit comprises a decompression circuit configured to decompress the configuration bit stream.

16. The integrated circuit package of claim 1, wherein the additional memory is configured to cache the configuration bit stream for the integrated circuit.

* * * * *